United States Patent
Müller et al.

(10) Patent No.: US 12,060,157 B2
(45) Date of Patent: Aug. 13, 2024

(54) MOUNT FOR DOUBLE-WALLED VESSEL, VESSEL COMPRISING A MOUNT AND VEHICLE COMPRISING A VESSEL

(71) Applicant: AIRBUS OPERATIONS GMBH, Hamburg (DE)

(72) Inventors: Markus Müller, Friedrichshafen (DE); Albrecht Kluge, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 177 days.

(21) Appl. No.: 17/853,265

(22) Filed: Jun. 29, 2022

(65) Prior Publication Data
US 2023/0002069 A1 Jan. 5, 2023

(30) Foreign Application Priority Data
Jun. 30, 2021 (EP) .................................... 21182905

(51) Int. Cl.
*B64D 37/30* (2006.01)
*B64D 37/06* (2006.01)
(Continued)

(52) U.S. Cl.
CPC ............ *B64D 37/30* (2013.01); *B64D 37/06* (2013.01); *F17C 13/086* (2013.01);
(Continued)

(58) Field of Classification Search
CPC ............ F17C 13/086; F17C 2203/032; F17C 2203/0391; F17C 2203/0629; F17C 2203/012; F17C 2203/014; F17C 2203/0663; F17C 2201/0109; F17C 2201/054; F17C 2201/056;
(Continued)

(56) References Cited

U.S. PATENT DOCUMENTS 2,874,865 A * 2/1959 Canty ................... F17C 13/086
220/592.27
3,010,599 A * 11/1961 Haines, Jr. ............. F17C 3/022
220/560.12
(Continued)

FOREIGN PATENT DOCUMENTS

CN 109 519 703 B 3/2019
DE 10 2016 224713 B3 4/2018
(Continued)

OTHER PUBLICATIONS

EP Search Report for Application No. 21182905 dated Jan. 18, 2022.

*Primary Examiner* — Robert J Hicks
(74) *Attorney, Agent, or Firm* — KDW Firm PLLC (57) ABSTRACT

A mount for a double-walled vessel includes a first support to support the mount against an outer wall of the double-walled vessel, a second support to support the mount against an inner wall of the double-walled vessel, and a flexible member connecting the first support and the second support. The first support and can be arranged at a first end of the flexible member and the second support can be arranged at a second end of the flexible member opposite to the first end. Further described are a vessel including at least one such mount as well as a vehicle including such vessel.

15 Claims, 4 Drawing Sheets

(51) Int. Cl.
*F17C 13/08* (2006.01)
*B60K 15/03* (2006.01)

(52) U.S. Cl.
CPC ........... *B60K 2015/03065* (2013.01); *F17C 2201/0109* (2013.01); *F17C 2201/054* (2013.01); *F17C 2201/056* (2013.01); *F17C 2203/012* (2013.01); *F17C 2203/014* (2013.01); *F17C 2203/032* (2013.01); *F17C 2203/0391* (2013.01); *F17C 2203/0629* (2013.01); *F17C 2203/0663* (2013.01); *F17C 2221/012* (2013.01); *F17C 2223/0169* (2013.01); *F17C 2223/033* (2013.01); *F17C 2260/033* (2013.01); *F17C 2270/0189* (2013.01)

(58) Field of Classification Search
CPC . F17C 2223/0109; B64D 37/30; B64D 37/06; Y10S 220/921; Y10S 220/918
USPC .... 220/4.14, 4.13, 4.12, 921, 920, 918, 562, 220/560.12, 560.11, 560.1
See application file for complete search history.

(56) References Cited

U.S. PATENT DOCUMENTS

| | | | | |
|---|---|---|---|---|
| 3,043,466 A | * | 7/1962 | Gardner | F17C 3/02 |
| | | | | 62/51.1 |
| 3,155,265 A | | 11/1964 | Reese | |
| 3,243,150 A | * | 3/1966 | Woodcock | B64G 1/402 |
| | | | | 244/135 R |
| 3,425,585 A | | 2/1969 | Latham | |
| 7,743,940 B2 | * | 6/2010 | Brunnhofer | F17C 1/06 |
| | | | | 220/592.27 |

FOREIGN PATENT DOCUMENTS

| | | |
|---|---|---|
| GB | 794 835 A | 5/1958 |
| GB | 2 488 461 A | 8/2012 |
| KR | 101 887 825 B1 | 9/2018 |
| KR | 2018 0106682 A | 10/2018 |

* cited by examiner

MOUNT FOR DOUBLE-WALLED VESSEL, VESSEL COMPRISING A MOUNT AND VEHICLE COMPRISING A VESSEL

CROSS-REFERENCE TO RELATED APPLICATION

This application claims priority to EP Patent Application No. 21182905.6 filed Jun. 30, 2021, the entire disclosure of which is incorporated by reference herein.

TECHNICAL FIELD

The disclosure herein relates to a mount for a double-walled vessel, such a vessel and a vehicle comprising a vessel. Particularly, the disclosure herein relates to a mount for a double-walled vessel having a flexible member and respective supports arranged at opposite ends of the flexible member. The disclosure herein further relates to a double-walled vessel comprising a plurality of such mounts and a vehicle comprising such vessel.

BACKGROUND

The number of domains where high-pressure and/or cryogenic fuels are used increases significantly. For instance, vehicles, such as cars, trucks, trains, aircrafts, and ships, use electric energy generated by fuel cells. The fuel for these fuel cells, such as hydrogen ($H_2$), is usually stored in a metallic tank surrounded by an insulation, which itself is covered by an outer shell. The hydrogen or other fuel is often stored at a very low temperature, for example, minus 250° C. or less.

Due to these low temperatures as well as high-pressure applications that comes with the storage of cryogenic fuels, the metallic tank usually experiences cycles of elongation and contraction, particularly relative to the insulation and outer shell. Thus, the metallic tank is mounted to the outer shell with a fixed support at one end and a gliding support at an opposite end. Such a gliding support is achieved, for example, by concentric cylindrical supports, which are stacked into one another and are capable of gliding with respect to one another.

However, such supports have the drawback of a high heat ingress into the metallic tank and, hence, the cryogenic fuel

SUMMARY

It is therefore an object of the disclosure herein to provide a mount, vessel and vehicle with improved thermal insulation capabilities regarding the storage of fuels.

This object is achieved by a mount, a vessel and a vehicle disclosed herein.

According to a first aspect to better understand the present disclosure, a mount for a double-walled vessel comprises a first support configured to support the mount against an outer wall of the double-walled vessel, a second support configured to support the mount against an inner wall of the double-walled vessel, and a flexible member connecting the first support and the second support. Particularly, the first support is arranged at a first end of the flexible member and the second support is arranged at a second end of the flexible member opposite to the first end. This mount facilitates a flexible support of the inner wall of the double-walled vessel without the necessity of a gliding support. The flexible member can be configured to sufficiently hold the weight of the inner wall of the double-walled vessel, i.e. the inner tank for a fuel, cryogenic fuel or the like, and at the same time provide sufficient flexibility to compensate for any elongation or contraction of the inner tank relative to the outer wall of the double-walled vessel, i.e. the outer vessel or shell or hull.

Since such mount does not require any gliding surfaces, it can be designed smaller than conventional gliding supports. This further improves insulation capabilities of the mount, since a smaller mount means less material thermally connecting the outer wall with the inner wall and, hence, a smaller mount decreases heat ingress into the inner tank. In addition, without any gliding surfaces the mount is subject to less or zero wear. This facilitates or even eliminates maintenance requirements for the mount. Specifically, a vessel comprising such mount is not required to be dissembled (removal of the outer wall and insulation) to check the status of the mount.

In an implementation variant, the first support can have an open cross-section. An open cross-section means that the cross-section of the first support does not consist fully of the material of the support. Rather, the first support has a particular shape in its cross-section that at least partially surrounds an empty space. Such open cross-section further improves insulation properties of the mount, since air or an insulation material can be provided in the space inside the first support. In addition, the open cross-section of the support further enhances elasticity of the mount.

Alternatively or additionally, the second support can have an open cross-section in any form, at least the ones described for the first support. As with the open cross-section of the first support, such second support may improve insulation properties and/or elasticity of the mount.

In another implementation variant, the first support can be an integral section of the flexible member. In other words, the first support is formed as a single piece with the flexible member. For instance, the first support can be made of the same material as the flexible member and/or extends from the flexible member. This facilitates the manufacturing of the mount, since the number of pieces forming the mount is reduced. In addition, an integral first support and flexible member does not require any maintenance or check, as it does not comprise any movable or connected components.

Alternatively or additionally, the second support can be an integral section of the flexible member. Thus, the second support is formed as a single piece with the flexible member. This also facilitates the manufacturing of the mount, since the number of pieces forming the mount is reduced, even down to one single piece. Such integral second support and flexible member achieve the same advantages as described for the integral first support.

In a further implementation variant, a portion of the first support can abut against the outer wall of the double-walled vessel. Such abutting may eliminate the need for any fastening structure at the outer wall. In other words, the outer wall may simply lie on the portion of the first support.

Alternatively or additionally, a portion of the second support can abut against the inner wall of the double-walled vessel. Likewise, such abutting may eliminate the need for any fastening structure at the inner wall. For instance, the inner wall may simply lie on or contact the portion of the second support. This abutting support further improves insulation capabilities, since the contacting surface (area) can be reduced to a minimum and no additional fastening structure is required, which would increase the heat ingress into the inner tank.

For example, the mount may have a Z-form or S-form in a side view (its cross-section). At each end of the mount is a contacting surface contacting and supporting the outer wall and inner wall, respectively.

In yet a further implementation variant, the portion of the first support can be formed to correspond to a shape of the outer wall of the double-walled vessel. For instance, vessels often have a cylindrical and/or spherical portion. The portion of the first support could form a corresponding part of such a cylindrical and/or spherical shape. For example, the portion of the first support may form an arc or similar form corresponding to an inner side of the outer wall.

Alternatively or additionally, the portion of the second support can be formed to correspond to a shape of the inner wall of the double-walled vessel. As the first support, the portion of the second support can form a cylindrical and/or spherical shape corresponding to a cylindrical and/or spherical portion of the inner wall, i.e. the inner tank. For example, the portion of the second support may form an arc or similar form corresponding to an outer side of the inner wall.

Alternatively or additionally, the first support and/or the second support can have a ball-like shape or a tubular shape, which reduces the contacting area between the first support and/or the second support and the outer/inner wall, respectively, to a minimum.

In an implementation variant, the flexible member can include at least one opening extending at least partially between the first end and the second end of the flexible member. Such opening reduces the material of the flexible member particularly in the longitudinal direction thereof (longitudinal means in a lengthwise direction from the first end to the second end). Such reduction in material increases flexibility of the flexible member and it further reduces the heat energy that can be transferred between the first end and the second end of the flexible member, so that insulation properties are improved.

In another implementation variant, the flexible member can be curved. Particularly, the flexible member between the first end and the second end can form a curve (i.e., in its cross-section, when view from a side including the first and second end). Such curve predefines a bending direction of the flexible member, so that support of the inner wall of the double-walled vessel with respect to the outer wall thereof can be facilitated. Alternatively, the flexible member can be straight.

In yet another implementation variant, the flexible member can be curved in a widthwise direction, i.e. a direction substantially perpendicular to the longitudinal direction. Specifically, the first end and the second end of the flexible member and/or the first support and second support can be arranged on an arc. The flexible member therebetween, hence, may follow the curved shape at its ends, so that the flexible member is curved in a widthwise direction. The radius or curvature of the flexible member in a widthwise direction can be concentric with a radius of the inner wall and/or outer wall, so that the mount equally and continuously closes the gap between the inner wall and outer wall.

Furthermore, if the flexible member is also curved in a longitudinal direction, the flexible member and, hence, also the entire mount may have the form of a portion of a torus. The resulting radius of the first end and the radius of the second end may be different. For instance, the radius of the second end (at the inner wall) may be smaller than the radius of the first end (at the outer wall). This reduces the contacting area of the second support contacting the inner wall and, hence, reduces heat ingress into the inner tank. Of course, the radius of the second end may be greater than the radius of the first end. This may facilitate mounting of the vessel, i.e. the outer wall and the inner wall with the mount in between.

In a further implementation variant, the flexible member and/or the entire mount can form a hyperboloid. Thus, the flexible member and/or mount is curved at least in the widthwise direction or even in the longitudinal direction and the widthwise direction. Such hyperbolic form provides for an improved length for a heat transfer path, so that heat ingress can be reduced. Particularly, when producing the curved flexible member and/or mount from/with a fiber reinforced composite material, a hyperboloid can be easily achieved, as the fibers can be laid in almost any curved shape.

In a further implementation variant, the first support can include at least one fastening component configured to fasten the first support to the outer wall of the double-walled vessel. Such fastening component can simply be a through-hole in the first support that is configured to receive a (threaded) bolt or other protruding fastening component protruding from the outer wall of the double-walled vessel. On the other hand, the fastening component can be a protruding fastening component protruding from the first support and configured to be received in a corresponding fastener, such as a through-hole, grommet or a nut. Such fastening component facilitates mounting of the vessel, particularly positioning the mount correctly with respect to the outer wall.

Alternatively or additionally, the second support can include at least one fastening component configured to fasten the second support to the inner wall of the double-walled vessel. The same fastening components/means can be employed as with the first support. Thus, repetition of their explanation is omitted. Such fastening component with/at the second support facilitates mounting of the vessel, particularly positioning the mount correctly with respect to the inner wall as well as positioning the inner wall correctly with respect to the outer wall, if the mount is already fixed/fastened to the outer wall. Thus, the inner wall, i.e. inner tank, can be mounted in the correct position with respect to the outer wall, for example, in a concentric manner with respect to the outer wall.

In yet a further implementation variant, the flexible member and/or the first support and/or the second support and can be made of a fiber reinforced material. For example, the fiber material can be a carbon fiber, glass fiber, synthetic fiber or ceramic fiber. The matrix material can be a thermoset, thermoplastic or ceramic material.

According to a second aspect to better understand the present disclosure, a mount assembly comprises a plurality of mounts according to the first aspect, which are connected to one another. For instance, the plurality of mounts may be connected to one another at their respective flexible member and/or at their respective first support and/or at their respective second support. Such mount assembly facilitates mounting of a vessel having such mount assembly, since the plurality of mounts can be set in place between the outer wall and inner wall of the vessel at once.

A connecting member connecting the plurality of mounts can be designed to not withstand the forces induced into each single mount from the inner wall to the outer wall or vice versa. Instead, the connecting member may only be designed to hold the plurality of mounts together. Thus, any heat ingress into the inner tank by such connecting member can be kept to a minimum. Optionally, a heat insulating material can be used for the connecting member, for example, a material different from the flexible member of the mounts.

According to a third aspect to better understand the present disclosure, a vessel comprises an inner wall forming a tank, an outer wall covering the inner wall, and at least one mount according to the first aspect or a mount assembly according to the second aspect arranged between the inner wall and the outer wall. The at least one mount can flexibly hold the inner wall spaced apart from the outer wall.

The mount(s) can be provided on one side of the inner wall (and also the outer wall). For instance, the mount(s) can be provided at a bottom and/or lateral side of the inner wall, i.e. the inner tank of the vessel. This allows holding and supporting the weight of the inner tank by the mount(s), which are themselves supported by the outer wall.

In an implementation variant, the vessel can further comprise an insulation provided between the inner wall and the outer wall. The insulation can be any heat insulation material, such as a multi-layer insulation (MLI) assisted by vacuum.

In another implementation variant, the vessel can further comprise a fixed support mounted to the inner wall and the outer wall. Such fixed support ensures a predefined gap between inner wall and outer wall. For example, the vessel may include a fixed support on one side of the inner tank and the plurality of mounts on an opposite side. This facilitates any elongation or contraction of the inner tank relative to the outer wall, since the flexible members of the mounts compensate for the elongation or contraction.

The fixed support may also allow transfer of higher forces than the flexible members of the plurality of mounts, such that the fixed support may be used at a bottom region of the inner tank to carry the weight of the inner tank.

In a further implementation variant, the vessel can include a fixed support on one side of the inner tank and one mount on an opposite side. In this case, the fixed support and/or the mount can span a greater radius for higher stability, such as more than 90°, preferably more than 180°, or even a full circle (360°). For instance, the fixed support and/or the mount may have the shape of a hyperboloid. This facilitates any elongation or contraction of the inner tank relative to the outer wall, while at the same time assembly of the vessel is fast and easy.

In yet another implementation variant, the inner wall can have a spherical portion and the outer wall and can have a spherical portion corresponding to the spherical portion of the inner wall. In such case, the at least one mounts can be arranged in-between the respective spherical portion of the inner wall and outer wall. For instance, the spherical portions of the inner wall and the outer wall may be concentric (have the same centre), so that a gap between the inner wall and the outer wall is equal over the spherical portion. This allows placing mounts of the same size in this gap, so that the number of different components required to build the vessel is reduced to a minimum.

Each of the at least one mount can span the distance between the inner wall and the outer wall in a direction different from the radial direction of the walls, i.e. in a direction different from the shortest distance between inner wall and outer wall. For instance, if the flexible member of each mount is not curved, the placing of the mount at an angle different from 90° to the surface of the inner wall or outer wall allows bending of the flexible member to compensate for any elongation or contraction of the inner tank and/or outer tank.

Due to the spherical shape of the inner wall and/or outer wall, the plurality of mounts can be placed, for example, on an inner side of the outer wall in the spherical portion and the inner tank can then be placed on the mounts. Particularly, if a plurality of mounts is arranged at different locations of the spherical portion of the outer wall sufficient stability can be achieved for the inner tank. When placing the inner wall onto the mounts, and closing the outer tank, the mounts may be slightly pressed into the gap between the inner wall and outer wall, so that the mounts are hold in place and do not require any further fastening components.

If the mounts are rather small in their widthwise direction, i.e. the mounts have a dimension in the longitudinal direction that is a multiple of its dimension in the widthwise direction, at least three mounts in the spherical portion of the inner wall and outer wall is preferable, in order to achieve a stable structure holding the inner tank in the outer tank.

In a further implementation variant, the inner wall can be configured to store a cryogenic fuel. Of course, the inner tank can be configured to store any fluid (gas or liquid), any fuel independent of its storage temperature. Nevertheless, the mounts provide good insulation capabilities while also providing a stable support for the inner tank within the outer tank.

Alternatively or additionally, the inner wall and/or the outer wall is made of a fiber-reinforced material. For example, the fiber material can be a carbon fiber, glass fiber, synthetic fiber or ceramic fiber. The matrix material can be a thermoset, thermoplastic or ceramic material. Such a vessel can provide sufficient stability for storing the fuel, but is lightweight compared to conventional metallic tanks. Moreover, an inner wall made of fiber-reinforced material, particularly a fiber-reinforced plastic, provides better insulation capabilities than a metallic tank.

According to a fourth aspect to better understand the present disclosure, a vehicle can comprise at least one vessel according to the third aspect. For example, such a vehicle can be a car, an aircraft, a bus, a truck, a train, or a ship.

Particularly in view of an aircraft, such as a plane, spacecraft, pseudo satellite, satellite or the like a maintenance free vessel is of advantage, since a downtime for such aircraft due to maintenance can be expensive for the operator of the aircraft. Furthermore, if the vessel is produced of a lightweight material, such as fiber reinforced material, the overall weight of the aircraft can be reduced, which is also advantageous for the operator of the aircraft, due to a reduced fuel consumption.

The present disclosure is not restricted to compensate for any movement of the inner tank and/or outer tank due to elongation or contraction thereof. Of course, vibration or other dynamic loads on the vessel may lead to a relative movement between inner tank and outer wall. The mount(s) provided in this disclosure, of course, also compensate for any such relative movement due to the flexibility of its/their flexible member(s).

The present disclosure is not restricted to the aspects and variants in the described form and order. Specifically, the description of aspects and implementation variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the disclosure herein are now explained in greater detail with reference to the enclosed schematic drawings, in which.

DETAILED DESCRIPTION

Figure 1:
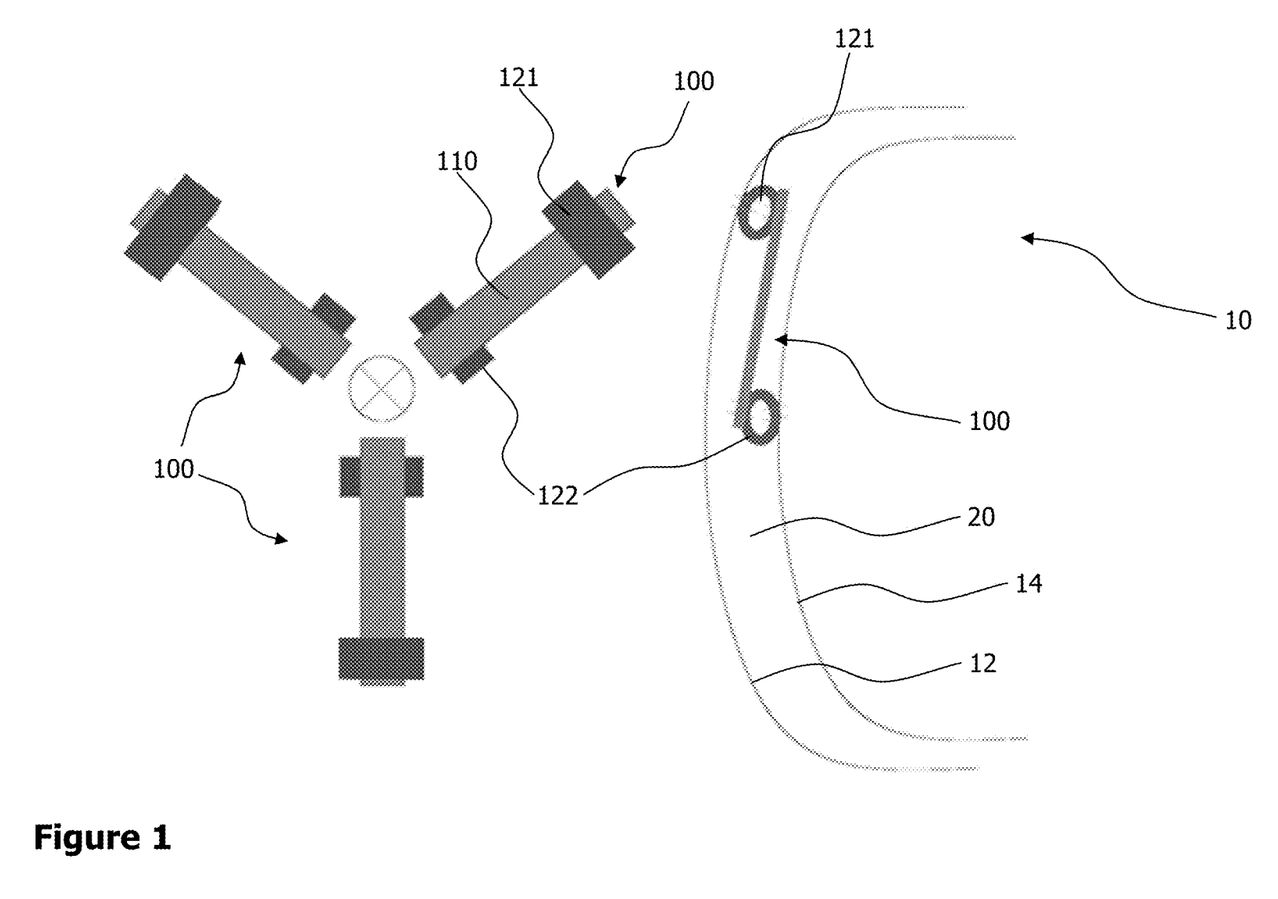
FIG. 1 schematically illustrates a portion of a vessel comprising a plurality of mounts.

FIG. 1 schematically illustrates a portion of a double-walled vessel 10 comprising a plurality of mounts 100. Specifically, the double-walled vessel 10 comprises an outer wall 12 forming a shell of the vessel, and an inner wall 14 forming an inner tank of the vessel. For instance, the inner tank 14 may be used to store fuel, such as cryogenic fuel. A space 20 between inner wall 14 and outer wall 12 can be filled with an insulation material, to keep the heat ingress into the inner tank 14 to a minimum.

In order to mount the inner tank 14 inside of the outer wall 12, a plurality of mounts 100 are provided. For example, the mounts 100 can be placed in a gap between inner wall 14 and outer wall 12. The mounts 100 are illustrated in FIG. 1 as being arranged at a lateral side of the vessel 10, for instance, a spherically shaped side of the inner tank 14 and outer wall 12. Next to the spherically shaped side of the vessel 10 may be a cylindrical portion of inner wall 14 and outer wall 12 (only partially illustrated in FIG. 1). At the illustrated lateral side of the vessel 10 particular movements of the inner tank 14 relative to the outer wall 12 may occur, for example, due to thermal elongation and contraction and/or vibrations or other dynamic loads acting on the vessel 10.

The entire vessel 10 can be made of a fiber-reinforced material. Particularly, the inner wall 14 and/or the outer wall 12 can be made of a fiber-reinforced material, such as a fiber reinforced thermoplastic material, in order to be lightweight and provide sufficient mechanical stability to store the fuel in the inner tank 14.

In the illustrated example, three mounts are provided to support the inner tank 14 relative to the outer wall 12. Each mount 100 in the illustrated example has a first support 121 configured to support mount 100 against the outer wall 12 of the double-walled vessel 100, a second support 122 configured to support the mount 100 against the inner wall 14 of the double-walled vessel 100, and a flexible member 110 connecting the first support 121 and the second support 122. The first support 121 is arranged at a first end of the flexible member 110 and the second support 122 is arranged at a second end of the flexible member 110 opposite to the first end. Thus, the flexible member 110 extends between the first and second support, so that it provides thermal insulation as well as mechanical flexibility to compensate for any relative movement between inner wall 14 and outer wall 12.

The mount 100 can be made of fiber-reinforced material, such as a fiber reinforced thermoplastic material. Particularly the flexible member 110 can be made of a fiber-reinforced material, in order to provide sufficient flexibility (elasticity). Such mount 100 is also lightweight, has good thermal insulating capabilities, and does not require maintenance.

The plurality of mounts 100 is arranged equidistant from one another within the gap between inner wall 14 and outer wall 12 relative to a circle formed by the spherical portion of this side of the vessel. As illustrated in the left in FIG. 1, for example, three mounts 100 may be arranged at a respective angle of 120°, in order to provide a symmetric support of the inner tank 14 with respect to the outer wall 12. It is to be understood, that any number of mounts 100 can be used and that they can be arranged symmetrically or asymmetrically to one another.

Figure 2:
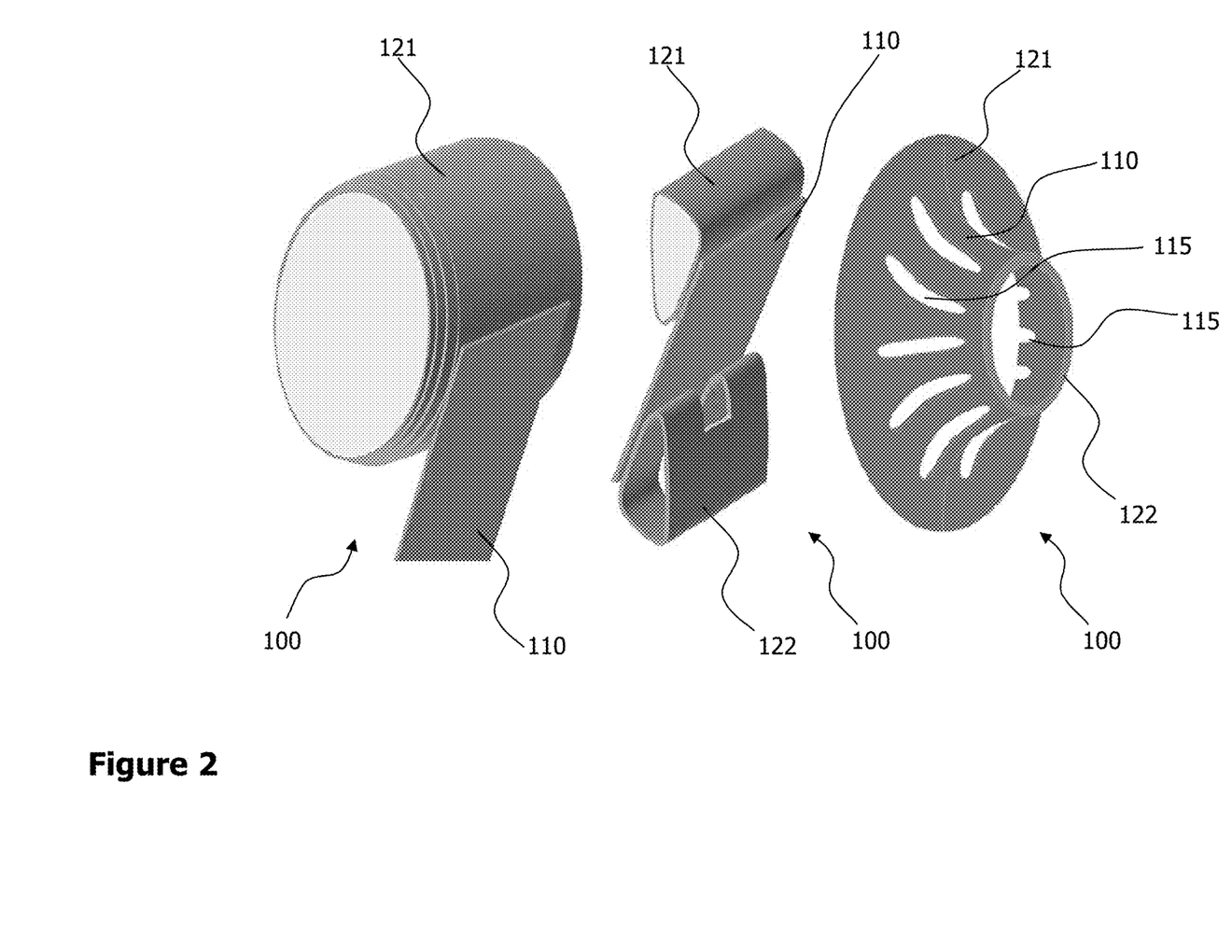
FIG. 2 schematically illustrates variants of mounts.

In the illustrated example in FIG. 1 as well as the left and middle example of a mount 100 in FIG. 2, the first support 121 can have an open cross-section and/or the second support 122 can have an open cross-section. The open cross-section in these examples is achieved by a tubular first/second support 121, 122 that has an empty interior space surrounded by the material forming the support 121, 122. This form additionally provides flexibility to the mount 100 as well as thermal insulation capabilities.

The open cross-section may be achieved by a circular or elliptical cross-sectional shape (e.g. FIG. 1 and left example in FIG. 2). Alternatively, at least one of the first and second support 121, 122 may have a triangular or other polygonal cross-sectional shape (e.g. middle example of FIG. 2). The cross-sectional shape can be adapted to the inner side of the outer wall 12 and/or the outer side of the inner wall 14. For instance, the triangular cross-sectional shape, according to the middle example of FIG. 2, has a rather flat surface providing for a greater contacting area abutting against the outer wall 12 or the inner wall 14, so that the mechanical stability is enhanced. Alternatively, according to the left example of FIG. 2, the round shape of the first/second support 121, 122, provides for a smaller contacting area abutting against the outer wall 12 or the inner wall 14, respectively, so that the transfer of heat and, hence, the heat ingress into the interior tank 14, is reduced.

It is to be understood that the cross-sectional shape of the first support 121 and/or second support 122 can be an open form, i.e. not a closed loop-like shape as illustrated in the drawings. For example, the cross-sectional shape may have a hook-shape or a single bend-shape. Such open form may be achieved by bending the first end and/or second end of the flexible member 110 to a first support 121 and/or second support 122, respectively. This particularly facilitates forming the mount 100 as an integral single piece member. Of course, even with a closed loop cross-sectional shape and the amount of 100 can be formed as an integral single piece member, for example, by bending the first/second end of the flexible member 110 to form a closed loop cross-section.

While the example mounts 100 of FIG. 1 and the left and middle example of FIG. 2 are rather small in a widthwise direction (e.g. along the tubular axis of the illustrated supports 121, 122), a mount 100 can also extend over a greater extent in a circumferential direction (circumferential relative to a longitudinal axis of the vessel 10).

Only as an example, FIG. 2 illustrates in the right example a mount 100 that extends completely in a circumferential direction, i.e. forms a ring-shaped mount 100. It is to be understood that such mount 100 can only extend over a certain portion of such ring, e.g. 45°, 90°, 120°, 180° or the like. Such mount 100 and particularly its flexible member 110 can have the form of a portion of a torus, with a smaller radius at an inner end (e.g. second support 122) and a greater radius at an outer end (e.g. first support 121). In any case, such mount 100 still provides a first support 121 abutting against the outer wall 12 of the double-walled vessel 10 as well as a second support 122 abutting against the inner wall 14 of the double-walled vessel 10.

For example, the first support 121 and/or second support 122 can be an integral section of the flexible member 110, i.e. the flexible member 110 at its respective end forms the first/second support 121, 122. In the example illustrated to the right in FIG. 2 the first/second supports 121, 122 are a flat end of the flexible member 110. It is to be understood that a support 121, 122 as illustrated to the left and in the middle of FIG. 2 or a support 121, 122 with an open form in its cross-section can also be employed with the mount 100 illustrated to the right in FIG. 2 either as a first support 121, a second support 122 or both.

The support 100 illustrated to the right in FIG. 2 allows forming the first/second support 121, 122 to correspond to a respective shape of the outer wall and the inner wall 14 of the vessel 10. Thus, from a mechanical standpoint the contacting area/surface of the first support 121 and second support 122 to the outer wall 12 and inner wall 14, respectively, is improved. Thus, such mount 100 facilitates positioning the inner tank 14 with respect to the outer wall 12 and also facilitates load transfer between inner tank 14 and outer wall 12.

Figure 3:
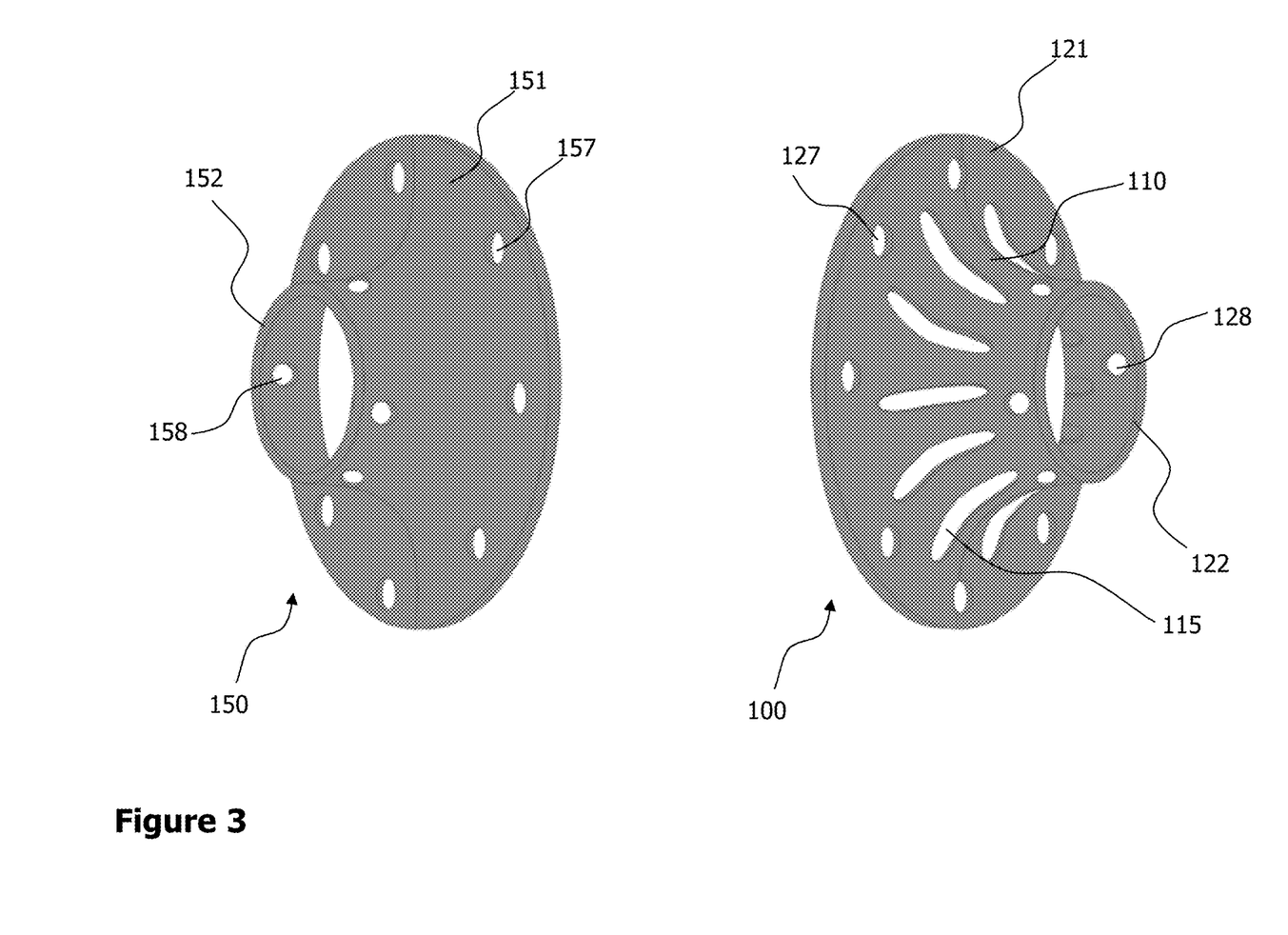
FIG. 3 schematically illustrates variants of a fixed mount and a flexible mount.

Furthermore, as illustrated in the right example of FIG. 2 as well as the right example of FIG. 3, the flexible member 110 can include at least one opening 115. For instance, such opening 115 can extend at least partially between the first end and the second end of the flexible member 110. This increases flexibility (elasticity) of the mount 100 and at the same time reduces a heat transfer and, hence, heat ingress into the inner tank 14.

FIG. 3 schematically illustrates variants of a fixed mount or fixed support 150 (to the left in FIG. 3) and a flexible mount 100 (to the right in FIG. 3). The flexible mount 100 can be any mount 100 as illustrated for example in FIG. 1 or 2. The flexible mount 100 illustrated to the right in FIG. 3 has the form of a portion of a torus or, particularly, a hyperboloid. A torus or hyperbolic mount 100, 150 allows optimizing an improved length for the heat transfer path between inner wall and outer wall combined with the benefits of a fiber reinforced composite material used to manufacture the mount 100, 150 or a portion thereof.

In addition, a mount 100 can optionally include fastening components. For example, the first support 121 can include at least one fastening component 127 configured to fasten the first support 121 to the outer wall 12. Alternatively or additionally, the second support 122 can include at least one fastening component 128 configured to fasten the second support 122 to the inner wall 14. In the illustrated example, such fastening components 127, 128 are simply achieved by providing through holes in the mount 100. The outer wall 12 and inner wall 14 may be provided with respective protrusions (not illustrated), which may be received in the fastening components 127, 128. Such fastening components may simply hold the mount 100 in place between the outer wall 12 and inner wall 14, but may be designed to not significantly contribute to mechanical stability, particularly a load transfer between inner wall 14 and outer wall 12.

The fixed mount or support 150 can be provided between the inner wall 14 and outer wall 12 of the vessel 10 at a side opposite to a side, where the flexible mount 100 is provided. Thus, any relative movement of the inner tank 14 with respect to the outer wall 12 may be compensated by the flexible mount 100, while the fixed support 150 provides for a substantially fixed gap between a first support 151 mounted against the inner wall 14 and a second support 152 mounted against the outer wall 12. Optionally, the fixed mount or support 150 can have fastening components 157, 158. Only as an example, such fastening components 157, 158 may be formed in the same manner as fastening components 127, 128 of the flexible mount 100, so that their explanation is omitted.

Of course, one or more flexible mounts 100 may be provided at opposite sides of the vessel, so that the relative movement of the inner tank 14 with respect to the outer wall 12 may be compensated by a plurality of flexible mounts 100.

Figure 4:
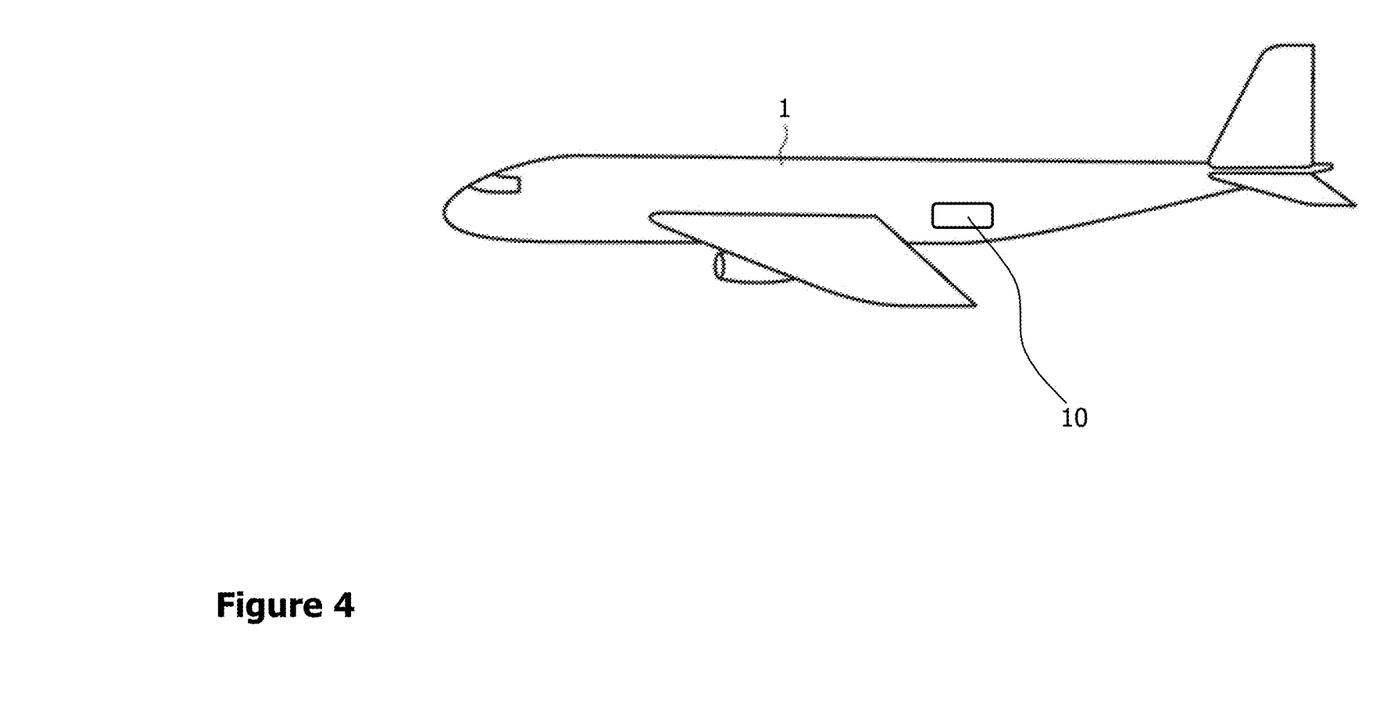
FIG. 4 schematically illustrates a vehicle.

FIG. 4 schematically illustrates a vehicle 1 comprising a vessel 10. Such vehicle 1 can be an aircraft, such as a plane, that employs vessel 10 as a storage for cryogenic fuel. For instance, the cryogenic fuel may be used to operate a fuel cell (not illustrated) to produce electrical energy.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mount for a double-walled vessel, comprising:
a first support configured to support the mount against an outer wall of the double-walled vessel;
a second support configured to support the mount against an inner wall of the double-walled vessel; and
a flexible member connecting the first support and the second support,
wherein the first support is at a first end of the flexible member and the second support is at a second end of the flexible member opposite to the first end; and
wherein the first support, the second support, and the flexible member together have one of a Z-form, an S-form, or a hyperboloid shape that is configured to extend between the outer wall and the inner wall of the double-walled vessel.

2. The mount according to claim 1, wherein the first support has an open cross-section, and/or wherein the second support has an open cross-section.

3. The mount according to claim 1, wherein the first support is an integral section of the flexible member, and/or wherein the second support is an integral section of the flexible member.

4. The mount according to claim 1, wherein a portion of the first support abuts against the outer wall of the double-walled vessel, and/or
wherein a portion of the second support abuts against the inner wall of the double-walled vessel.

5. The mount according to claim 4, wherein the portion of the first support is formed to correspond to a shape of the outer wall of the double-walled vessel, and/or
wherein the portion of the second support is formed to correspond to a shape of the inner wall of the double-walled vessel.

6. The mount according to claim 1, wherein the flexible member includes at least one opening extending at least partially between the first end and the second end of the flexible member.

7. The mount according to claim 1, wherein the flexible member is curved.

8. The mount according to claim 1, wherein the first support includes at least one fastening component configured to fasten the first support to the outer wall of the double-walled vessel, and/or
   wherein the second support includes at least one fastening component configured to fasten the second support to the inner wall of the double-walled vessel.

9. The mount according to claim 1, wherein the flexible member and/or the first support and or the second support is made of a fiber reinforced material.

10. A vessel comprising:
    an inner wall forming a tank;
    an outer wall covering the inner wall; and
    at least one mount according to claim 1 between the inner wall and the outer wall, wherein the at least one mount flexibly holds the inner wall spaced apart from the outer wall.

11. A vessel according to claim 10, comprising an insulation between the inner wall and the outer wall.

12. The vessel according to claim 10, comprising a fixed support mounted to the inner wall and the outer wall.

13. The vessel according to claim 10, wherein the inner wall has a spherical portion and the outer wall has a spherical portion corresponding to the spherical portion of the inner wall, and wherein the at least one mount is between a respective spherical portion of the inner wall and outer wall.

14. The vessel according to claim 10, wherein the inner wall is configured to store a cryogenic fuel, and/or
    wherein the inner wall and or the outer wall is made of a fiber-reinforced plastic.

15. A vehicle comprising a vessel according to claim 10.

* * * * *